United States Patent [19]

Ishii

[11] 3,789,148

[45] Jan. 29, 1974

[54] MULTIPLEX TRANSMISSION METHOD

[75] Inventor: Yasushi Ishii, Tokyo, Japan

[73] Assignee: Nissan Motor Company, Yokohama City, Japan; a part interest

[22] Filed: Feb. 3, 1971

[21] Appl. No.: 112,159

[30] Foreign Application Priority Data

Feb. 18, 1970 Japan ............ 45-13431
June 10, 1970 Japan ............ 45-49484

[52] U.S. Cl. .......... 179/15 AL, 179/15 BY
[51] Int. Cl. .......... H04j 3/08
[58] Field of Search...179/15 BA, 15 BQ, 15 BY, 15 AL, 179/15 AP, 15 BC; 178/50

[56] References Cited

UNITED STATES PATENTS

| | | | |
|---|---|---|---|
| 3,519,746 | 7/1970 | Gutleber | 179/15 AP |
| 2,520,185 | 8/1950 | Van Mierlo | 179/15 AL |
| 3,158,864 | 11/1964 | Lehan | 179/15 BA |

*Primary Examiner*—Ralph D. Blakeslee
*Attorney, Agent, or Firm*—Robert E. Burns; Emmanuel J. Lobato

[57] ABSTRACT

A multiplex transmission method using a plurality of carrier signals each of which is not correlated with one another. The carrier signals are derived from e.g., an irregular signal. Each of the carrier signals is modulated with an information signal by multiplying the former with the latter. Thereafter, the thus modulated carrier signals are demodulated by cross-correlating the sum of the modulated carrier signals and each of the original carrier signals, which is equal to the average energy of the product over one period, thereby to reproduce the information signal.

14 Claims, 14 Drawing Figures

MULTIPLEX TRANSMISSION METHOD

This invention relates to a multiplex transmission method and system, and more particularly to a multiplex transmission system and method using random signals such as maximum length linear shift-register sequence signals as its reference signals.

In an industrial process control system using a central computer, it is important that a number of signals including controlling signals and feed-back signals be transmitted between the central computer and terminal control units. For this purpose, the central computer is usually connected to the terminal control units by means of a number of individual full lines, resulting in an increased production cost and large-sized construction of the system as a whole. Thus, it is preferable to apply a multiplex transmission system for the transmission of the numerous signals thus using a smaller number of full lines. Various multiplex systems such as heretofore been devised, including frequency division and time division multiplexing systems, are not fully acceptable because of their costly and complicated construction.

Accordingly, it is an object of the present invention to provide a simple and economical multiplex transmission method and system.

Another object is to provide a multiplex transmission method and system which is substantially free from unwanted disturbances.

To achieve these objects, this invention proposes to use an random reference signal in the multiplex transmission system. The random reference signal is applied to all the senders and the receivers through a common bus line. Each of the senders converts the reference signal into a carrier signal which is allocated to the particular sender and the resultant carrier signal is then multiplied by an information signal and sent to the associated receiver. The signals delivered from all the senders are supplied to another common bus line. In this instance, the carrier signals allocated to different senders are not correlated or non-correlated with one another. Each of the receivers, on the other hand, converts the reference signal into the same carrier signal that is allocated to the associated sender, thereby reproducing the information signal.

Figure 3:
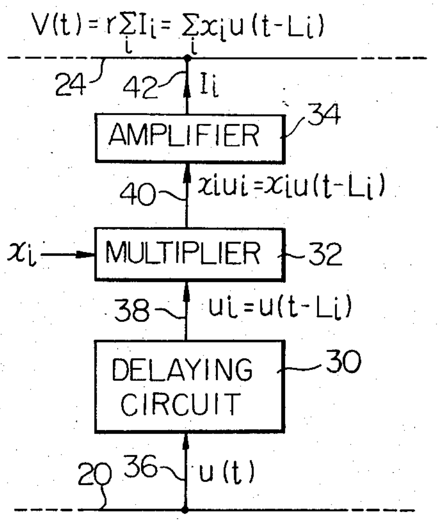
FIG. 3 is a block diagram of a sender of the multiplex transmission system.
Figure 4:
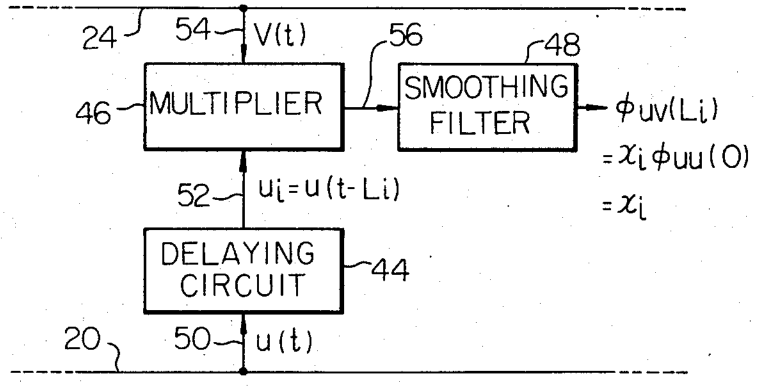
FIG. 4 is a block diagram of a receiver of the system.
Figure 5:
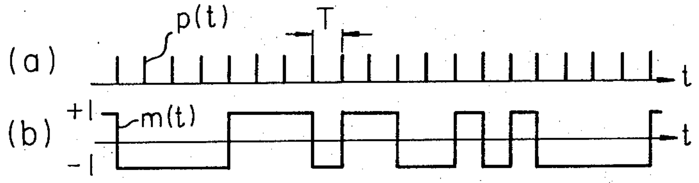
FIG. 5 is a graph showing a clock pulse train and an M-sequence signal resulting from the clock pulse train.
Figure 6:
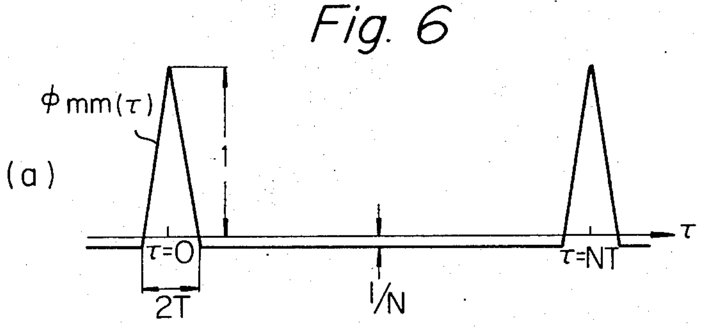
Figure 6:
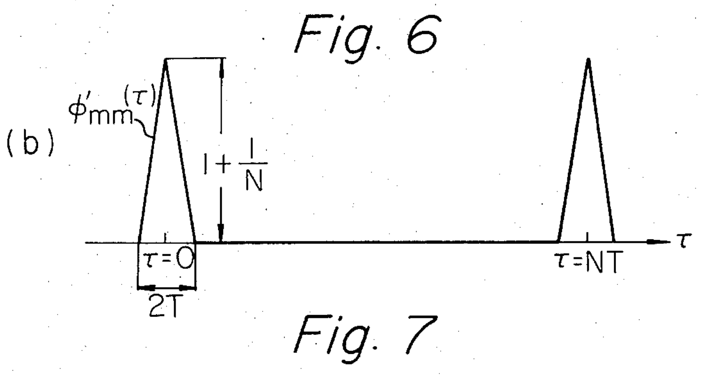
Figure 7:
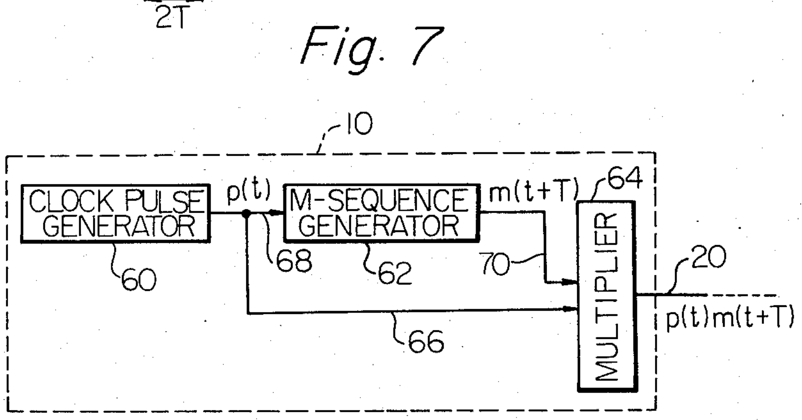
Figure 8:
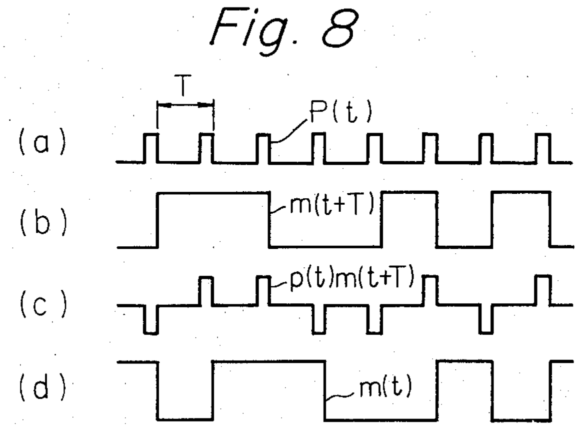
Figure 9:
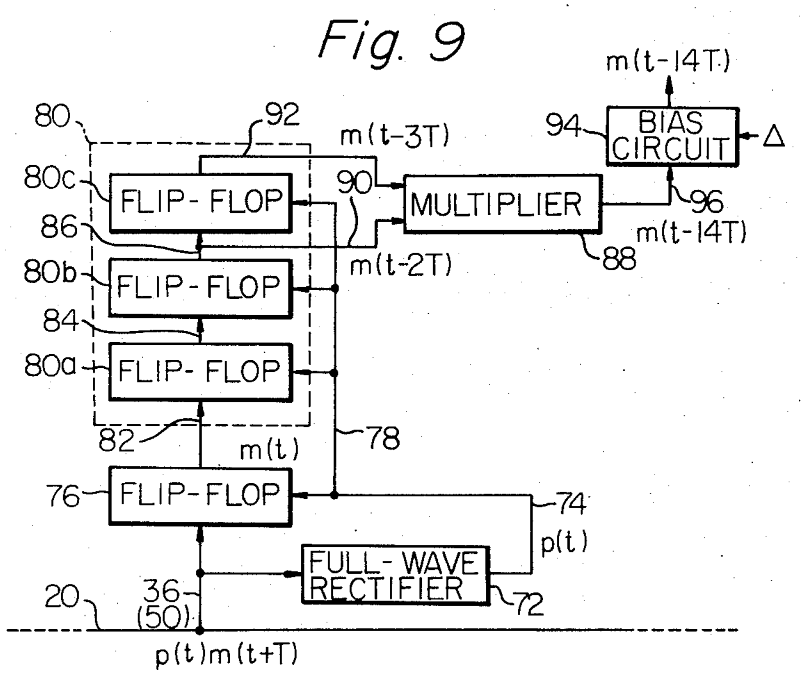
Figure 10:
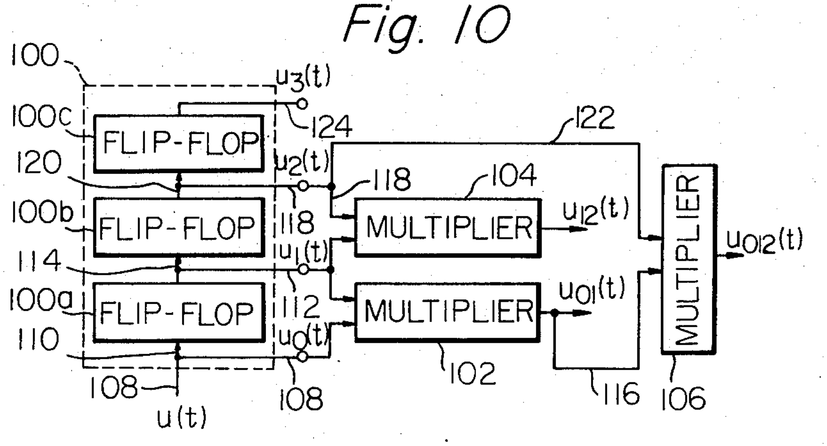
Figure 11:
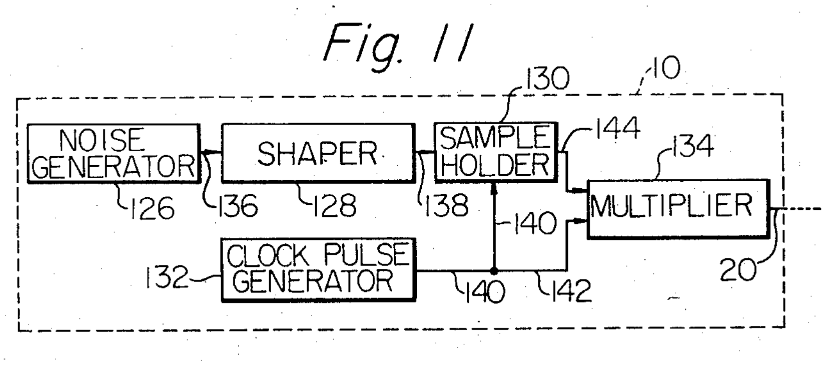
Figure 12:
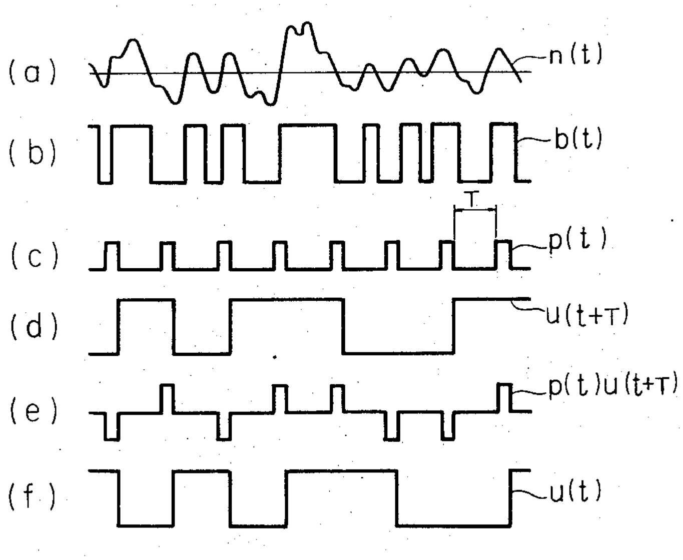
Figure 13:
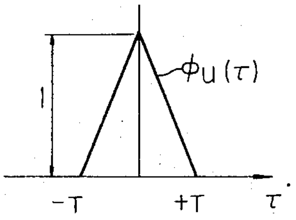

FIGS. 6 and 6*b* show autocorrelation functions of the M-sequence signal of FIG. 5;

FIG. 7 is a block diagram of an embodiment of an M-sequence reference signal generator used for the multiplex transmission system;

FIG. 8 illustrates different wave-forms of the signals in the generator of FIG. 7;

FIG. 9 is a block diagram of a delaying circuit used in the sender of FIG. 3 or the receiver of FIG. 4;

FIG. 10 is a block diagram showing a general form of the delaying circuit;

FIG. 11 is a block diagram illustrating a modification of the signal generator shown in FIG. 7;

FIG. 12 illustrates different wave-forms of the signals produced by the signal generator of FIG. 11; and FIG. 13 is a graph illustrating an autocorrelation function of the output signal of the generator of FIG. 11.

Figure 1:
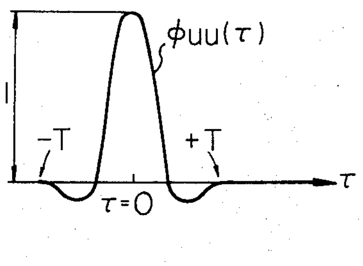
FIG. 1 is a graph showing an autocorrelation function of a random signal used as a reference signal in a multiplex transmission system according to the invention.

Referring now to FIG. 1, the autocorrelation function $\phi_{uu}(\tau)$ is defined as a mean value of the product of a reference signal $u(t)$ and its delayed replica which is delayed for time $\tau$ from the reference signal $u(t)$, as represented by:

$$\phi_{uu}(\tau) = \overline{u(t-\tau)u(t)} \tag{1}$$

This autocorrelation function $\phi_{uu}(\tau)$ becomes a maximum when $\tau = 0$ and for the sake of simplicity of description, it is herein assumed that such maximum value of the autocorrelation function is expressed as:

$$\phi_{uu}(o) = \overline{u^2(t)} = 1 \tag{2}$$

It is apparent that this assumption does not spoil the general adaptability of the expression (1). It is also assumed that, if $|\tau| \geqq T$ then, $$\phi_{uu}(\tau) = 0, \tag{3}$$

where $T$ is a predetermined time period.

Equation (3) means that the two values of the signal $u(t)$, occurring apart at a time interval of $T$ are not correlated with each other. This will hold unconditionably inasmuch as frequency band width of the signal $u(t)$ is sufficiently large.

Figure 2:
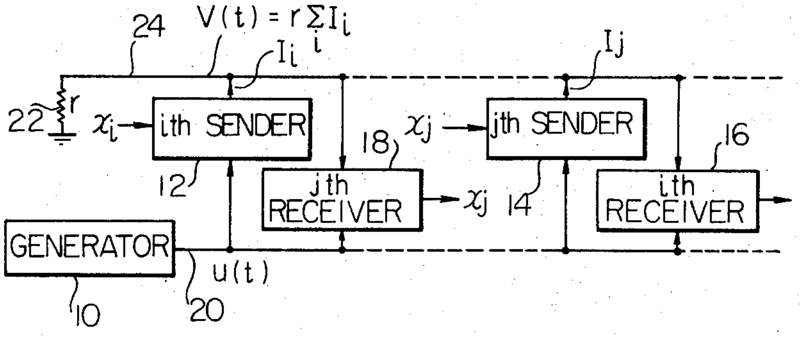
FIG. 2 is a schematic block diagram of the multiplex transmission system.

FIG. 2 is a schematic block diagram of the multiplex transmission system according to this invention. The system comprises means for generating a reference signal including a generator 10 which is adapted to generate a reference signal which is a random signal $u(t)$, the autocorrelation function of which satisfies the requirements of equations (1), (2) and (3). The signal generator 10 is connected to a number of transmitter means comprising senders including $i$th and $j$th senders 12 and 14, respectively, and a number of receiver means comprising receivers including $i$th and $j$th receivers 16 and 18. Every senders has its associated receiver or receivers and the illustrated $i$th and $j$th senders are herein assumed to be associated with the $i$th and $j$th receivers, respectively. The number of the senders may not be in agreement with the number of the receivers because one sender can be associated with two or more receivers. The senders and receivers are connected in parallel with each other and to the generator 10 through a common reference bus line 20. The random signal $u(t)$ delivered from the signal generator 10 is applied to all the senders and receivers through the reference bus line 20. Each of the senders and receivers is adapted to convert the random reference signal $u(t)$ into its own carrier signal.

When, the $i$th sender 12 receives the random reference signal $u(t)$, the signal $u(t)$ is converted into carrier signal $u_i(t)$ to which it is allocated. The resultant carrier signal $u_i(t)$ is multiplied by an information signal $x_i$ which is allocated to the particular sender. The product signal $x_i u_i(t)$ is applied through a transmission bus line 24 to the grounded resistor 22, thereby causing a current signal $I_i$ to flow through the transmission bus line 24 to the resistor 22.

All the senders, and the receivers as well, are connected to this transmission bus line 24 so that the carrier signals delivered from all the senders are superposed on one another through the transmission bus line 24. The voltage signal $v(t)$ appearing on the transmission bus line 24 is represented by the equation:

$$v(t) = r \sum_i I_i \tag{4}$$

The $i$th receiver 16 thus receives not only the reference signal $u(t)$, but the voltage signal $v(t)$ in order to derive from the signal $v(t)$ a signal component multiplied by the carrier signal $u_i(t)$, from which the information signal $x_i$ is reproduced. Likewise, the $j$th receiver 18 reproduces an information signal $x_j$ assigned to the associated $j$th sender 14.

FIG. 3 illustrates a detailed construction arrangement of one of the senders applicable to the multiplex transmission system shown in FIG. 2. The sender, exemplified by the $i$th sender 12, comprises means for delaying the reference signal including a delaying circuit 30, means for multiplying including a multiplier 32 and an amplifier 34, which are connected in series between the bus lines 20 and 24. The random reference signal $u(t)$ on the reference bus line 20 is applied through a line 36 to the delaying circuit 30 which then produces a signal $u(t-L_i)$ in a predetermined delay time $L_i$. The delayed signal $u(t-L_i)$ is applied through a line 38 to the multiplier 32 which multiplies the signal $u(t-L_i)$ by the given information signal $x_i$. The output signal representing the product $u(t-L_i)\cdot x_i$ is applied to means for summing including the amplifier 34 through a line 40. The output signal of the amplifier is applied to the transmission bus line 24 through a line 42.

In this instance, the information signal $x_i$ may be either an analogue or digital signal. If the information signal $x_i$ is a digital signal, assuming a logical value "1" or "0," the multiplier 32 may in practice be replaced by a gate circuit permitting intermittent passage of the signal $u(t-L_i)$ in accordance with the information signal $x_i$ therethrough.

The amplifier 34 is of a constant-current type and supplies the current $I_i$ to the transmission bus line 24 when the signal representing the value $x_i\cdot u(t-L_i)$ is present at the input of the amplifier thus presenting the voltage signal $v(t)$ on the transmission bus line 24. For simplicity of discussion, it is herein assumed that the resistance 22 and the gain of the amplifier 34 are suitably adjusted and the voltage signal $v(t)$ is expressed as:

$$v(t) = r \sum_i I_i = \sum_i x_i u(t-L_i) \tag{5}$$

FIG. 4 illustrates a detailed construction arrangement of one of the receivers, exemplified by the $i$th receiver 16, forming part of the multiplex transmission system shown in FIG. 2. As shown, the receiver 16 comprises means for delaying comprising a delaying circuit 44 and means for cross-correlating comprising, a multiplier 46 and a smoothing filter 48, the delaying circuit 44 and the multiplier 46 connected in series between the bus lines 20 and 24 and the smoothing filter 48 connected to the output of multiplier 46. The delaying circuit 44 establishes a delay time $L_i$ which is the same as the delay time allocated to the delaying circuit 30 of the $i$th sender.

The reference signal $u(t)$ on the line 20 is applied through a line 50 to the delaying circuit 44 so that the reference signal $u(t)$ is delayed for the delay time $L_i$. The delayed signal $u(t-L_i)$ is applied through a line 52 to the multiplier 46 which multiplies the signal $u(t-L_i)$ by the voltage signal $v(t)$ which is fed from the transmission bus line 24 through a line 54. The output signal of the multiplier 46, now representing the product $v(t)\cdot u(t-L_i)$, is applied to the smoothing filter 48 through a line 56. The output signal of the smoothing filter 48 represents a value $\phi_{uv}(L_i)$ which is expressed as:

$$\phi_{uv}(L_i) = \overline{u(t-L_i)\, v(t)} \tag{6}$$

If, in this instance, the delay times allotted to all the senders differ from one another by a time duration exceeding time $T$, then only the component $u(t-L_i)$ of the signal $v(t)$ will lend itself to the crosscorrelation function $\phi_{uv}(L_i)$, which is consequently expressed as:

$$\phi_{uv}(L_i) = \overline{x_i u_i(t-L_i) u_i(t-L_i)} = x_i \phi_{uu}(0) \tag{7}$$

In, consideration of the convention established by equation (2), the following relationship now hold:

$$\phi_{uv}(L_i) = x_i \tag{8}$$

It is apparent from equation (8) that the output of the smoothing filter 48, that is the crosscorrelation function $\phi_{uv}(L_i)$, equals the value of the information signal $x_i$.

It will now be appreciated from the foregoing discussion that the output signal of a certain sender is picked up exclusively by the associated receiver and converted into the original information signal notwithstanding the coexistence of the other signals delivered from the remaining senders to the transmission bus line. Thus, a variety of information signals supplied from the numerous senders can be transmitted to the associated receivers by use of senders which have delay times differing from other by time durations each longer than time $T$ and receivers which are associated with the senders and which are responsive to the signals with delay times allocated to associated sender.

One of the outstanding features of the method and system of the multiplex transmission according to this invention is that the transmitted signals are practically free from external disturbances. Noise superposed on the voltage signal $v(t)$ on the bus line 24 does not seriously affect the output signal of the receiver after the output signal is averaged by the smoothing filter insofar as the noise is stochastically independent from the voltage signal $v(t)$. The noise superposed on the reference signal on the line 20 would only contribute to widening the frequency band of the reference signal $u(t)$, if the noise has a relatively high frequency. In this instance, the reference signal $u(t)$ superposed with the noise is deemed in its entirety as an independent reference signal. Where the noise superposed on the reference signal is a low frequency noise such as hum of a power source, it may result in the autocorrelation function $\phi_{uu}(\tau)$ failing to become zero when $|\tau| \geqq T$. This will be avoided through provision of a suitable high-pass filter at the input terminal of each of the senders and receivers so as to block the low frequency portion including the hum.

Where it is desired to use an analogue signal as the information signal the multiplier 32 or 46 may be a four-quadrant operation multiplier. By preference, the multiplier may be replaced with a potentiometer adapted to produce an output signal having an amplitude which is proportional to the potentiometer setting.

The reference signal $u(t)$ used in the method and system of the multiplex transmission according to this invention may be a random signal of any type and waveform, insofar as its autocorrelation function meets the requirement of equation (3). Thus, the reference signal $u(t)$ may be a binary random signal which assumes +1 or −1 stochastically randomly with time. The use of such a binary signal will prove advantageous because the construction of the multipliers can be simplified significantly and because shift-registers can be utilized as the delaying circuit. Such advantages will be pronounced by using a logically generated pseudo-random signal rather than using a random signal that is physically generated.

A representative example of the various pseudo-random signals usable as the reference signal is a maximum length linear shift-register sequence signal (abbreviated to M-sequence signal). FIG. 5*a* illustrates a clock pulse train $p(t)$ having a repetition period T. FIG. 5*b* indicates an M-sequence signal $m(t)$ resulting from the clock pulse train $p(t)$, wherein the M-sequence signal $m(t)$ has a value +1 or −1.

The autocorrelation function $\phi_{mm}(t)$ of an M-sequence signal $m(t)$ is indicated in FIG. 6*a*. If, referring to FIG. 6*a*, the period of the M-sequence $m(t)$ is $NT$, the bottom level of the autocorrelation function of the M-sequence is deviated from the zero level by $-1/N$. Another function $m'(t)$ is now given as follows:

$$m'(t) = m(t) + \Delta$$

where $$\Delta = (1 + \sqrt{1+N})/N \text{ or } (1 - \sqrt{1+N})/N \quad (9)$$

The auotcorrelation function $\phi'_{mm}(\tau)$ of the function $m'(t)$ is shown in FIG. 6*b*. The bottom level of the autocorrelation function $\phi'_{mm}{}'(\tau)$ is zero, namely, the value of the function $\phi'_{mm}(\tau)$ equals zero outside the range of $\tau = KNT \pm T$, where $K$ represents integers.

FIG. 7 illustrates a preferred construction of the signal generator 10 of FIG. 2 which is adapted to generate a reference signal including an M-sequence signal. As shown, the signal generator comprises a clock pulse generator 60, an M-sequence generator 62 and a multiplier 64. The clock pulse generator 60 is connected to the multiplier 64 through a line 66 and to the M-sequence generator 62 through a line 68. The M-sequence generator 62, in turn, is connected to the other input of the multiplier 64. The clock pulse generator 60 is adapted to generate a clock pulse train $p(t)$ shown in FIG. 8*a*. The clock pulse train $p(t)$ is applied through the line 66 to one input of the multiplier 64 and also applied through the line 68 to the M-sequence generator 62 which then produces an M-sequence signal $m(t+T)$ shown in FIG. 8*b*. The M-sequence signal is applied through a line 70 to the other input of the multiplier 64 which produces an output signal which is a product $p(t)m(t + T)$ of the clock pulse and the M-sequence signal, this output signal being shown in FIG. 8*c*. The signal $p(t)m(t+T)$, which in itself has a wave form different from the waveform of an M-sequence signal, serves as an equivalent to the M-sequence signal.

FIG. 9 illustrates a preferred construction of the delaying circuit 30 or 44 which is adapted to receive the above described signal $p(t)m(t+T)$ from the line 20 and to produce the M-sequence signal delayed by a desired time period.

The delaying circuit of FIG. 9 comprises a full-wave rectifier 72 which is adapted to receive the signal $p(t)m(t+T)$ and to reproduce the clock pulse train $p(t)$. The reproduced clock pulse train $p(t)$ is applied to the flip-flop circuit 76 through a line 74 and to a shift-register 80 through a line 78. The shift-register 80 includes first, second and third flip-flop circuits 80*a*, 80*b* and 80*c*, respectively, connected in series with each other. The signal $p(t)m(t+T)$ on the line 20 is applied to the flip-flop circuit 76 which changes its state at the trailing edge of the clock pulse $p(t)$ in accordance with the state of the signal $p(t)m(t+T)$ immediately before the flip-flop circuit 76 changes its state. The output signal of the flip-flop circuit 76 is, therefore, the signal $m(t)$ of FIG. 8*d* which is applied through a line 82 to the first flip-flop circuit 80*a* of the shift-register 80. The signal $m(t)$ is delayed the time period T and is then applied to the second flip-flop circuit 80*b* through a line 84.

The second flip-flop circuit 80*b* then produces a signal $m(t-2T)$, which is applied to the third flip-flop circuit 80*c* through a line 86 and to one terminal of the multiplier 88 through a line 90. The third flip-flop circuit 80*c* then produces a signal $m(t-3T)$, which is applied to the other input of the multiplier 88 through a line 92.

One of the characteristics of the M-sequence signals is that the signal can be readily delayed integral times of the repetition time $T$ of the clock pulse by a simple logical operation. For instance, in the case of the fourth-order M-sequence signal shown in FIG. 5, the following relation holds:

$$m(t-2T)m(t-3T) = m(t-14T) \quad (10)$$

Hence, the multiplier 88 produces a signal $m(t-14T)$, which is then applied to a bias circuit 94 through a line 96. The bias circuit 94 then produces a signal $m'(t-14T)$ which is equal to $m(t-14T) + \Delta$, as will be understood from equation (9). Generally, in order to have an $n$th-order M-sequence signal delayed, it suffices to use an $n$-1 stage shift-register, not a shift-register having stages corresponding in number to the desired delay time units. The delayed M-sequence $m'(t-14T)$ signal corresponds to the signal $u(t-L_i)$ of FIGS. 3 and 4, and is regarded as a signal carrier for the information signal $x_i$.

It should be noted that, where the $n$th-order M-sequence signal is used, the number of the communication channels of the system is not more than $N = 2^n - 1$ because the $n$th-order M-sequence signal has its repetition period $NT = (2^n - 1)T$, where $T$ is the repetition period of the clock pulse train from which the $n$th-order M-sequence signal is derived.

Where the M-sequence signal is utilized as the reference signal for multiplex transmission purposes, the signal transmitted is hardly affected by the noise imparted thereto. Even in the event that both the sender and the associated receiver simultaneously err in reproducing the M-sequence signal, the resultant M-sequence signal can still be used as the reference signal without resort to making any compensation and without detriment to the transmission performance, because such error results only in negligibly varying the frequency spectrum of the M-sequence signal. In case either the sender or the receiver errs in reproducing the M-sequence signal, the resultant M-sequence signal can be used as the reference signal because the duration of the error is not longer than the time period during which the erred portion of the M-sequence signal passes through the shift-register, and this passage time is far shorter than the time constant of the smoothing filter so that the error will not appreciably affect the transmission performance.

Now, although it has been stated that two full lines are used for the reference and transmission lines 20 and 24, respectively, this does not imply the necessity of using two physically independent lines. If, for instance, a reference signal having a relatively large amplitude and a relatively small pulse width is used so as to enable a major portion of its energy to fall within a high frequency range, both the reference and transmission signals may be supplied to a common bus line whereby the two signals, now superposed on each other, can be separated from each other by means of a suitable filter.

Now, it will be shown here that the characteristics of M-sequence signals as shown in equation (10) can be generalized to any random signals including physically generated random signals.

FIG. 10 illustrates part of the delaying circuit of FIG. 9 in a general form, which is adapted to produce from the reference signal $u(t)$ a plurality of signals which are not correlated with each other. The shown circuit comprises a shift-register 100 including first, second and third flip-flop circuits 100*a*, 100*b* and 100*c*, respectively, to which the same delay time is allocated and which are connected in series, with each other, and first, second and third multipliers 102, 104 and 106, respectively.

The reference signal $u(t)$ is applied through a line 108 to one input of the first multiplier, which consequently produces an output signal $u_{01}(t)$. The reference signal $u(t)$ is also applied through a line 110 to the first flip-flop circuit 100*a* and is thereby delayed the time period $T$. The output signal $u_1(t)$ of the first flip-flop circuit is applied through a line 112 to one input of the second multiplier 104 and the other input of the first multiplier 102, which accordingly produces an output signal $u_{01}(t)$ which is applied to the third multiplier 106 through a line 116. The signal $u_1(t)$ is also supplied through a line 114 to the second flip-flop circuit 100*b*. The output signal $u_2(t)$ of the second flip-flop circuit 100*b* is applied through a line 118 to the other input of the second multiplier 104, which accordingly produces an output signal $u_{12}(t)$. The output signal $u\ _2(t)$ is also applied to the other input of the third multiplier 106 through a line 122, which then produces its output signal $u_{012}\ (t)$. The output signal $u_2(t)$ of the second flip-flop circuit 100*b* is also applied to the third flip-flop circuit 100*c* through a line 120. The third flip-flop circuit 100*c* then produces an output signal $u_3(t)$ at its output terminal 124.

The tap signals such as $u_0(t)$, $u_1(t)$, $u_2(t)$ and $u_3(t)$ are non-correlated with each other. If, in this instance, the signal $u_{01}(t)$ is multiplied by the signal $u_{12}(t)$ and averaged, then the following relation will hold:

$$\overline{u_{01}(t)\ u_{12}(t)} = \overline{u_0(t)\ u_1(t)\ u_1(t)\ u_2(t)} = \overline{u_1^2(t)}\ \overline{u_0(t)\ u_2(t)} = 0 \quad (11)$$

It is thus apparent that the signals $u_{01}(t)$ and $u_{12}(t)$ are non-correlated with each other.

As to the tap signals $u_0(t)$ and $u_{01}(t)$, a similar relation holds as follows:

$$\overline{u_0(t)\ u_{01}(t)} = \overline{u_0(t)\ u_0(t)\ u_1(t)} = \overline{u_0^2(t)}\ \overline{u_1(t)} = 0 \quad (12)$$

provided that the value of $u(t)$, which is equal to $u$, $(t)$, is zero. Thus, signals $u_0(t)$ and $u_{01}(t)$ are non-correlated with each other.

It will be proved in this manner that any other the signals $u_{01}(t)$, $u_{02}(t)$, . . . . each made up of two non-correlated tap signals and the signal $u_{012}(t)$, $u_{013}(t)$ . . . made up of three non-correlated tap signals are non-correlated with each other.

If, therefore, an $n$ number of non-correlated signals are given, non-correlated signals will be produced in a number expressed as:

$$\sum_{r=1}^{n} {}_nC_r = 2^n - 1, \quad (13)$$

including the number of the initially given tap signals. The non-correlation between two arbitrarily selected signals $u_i(t)$ and $u_j(t)$ can thus be ascertained invariably from the relation:

$$\overline{u_i(t)\ u_j(t)} = 0 \quad (14)$$

Because of the convention established by equation (2), the following equation will also hold:

$$\overline{u_i^2(t)} = 1 \quad (15)$$

From this, it is evident that a $2^n - 1$ number of non-correlated signals establish an orthonormal system, of course, this general expression includes the characteristics of M-sequence signals shown in equation (10) as its special case; in which the product of the tap signals is a delayed replica of the original signal. From the discussion mentioned above, it is enough that mutually non-correlated signals be produced in a number corresponding to the number of the transmission channels. When, in this instance, the numerous signals are generated merely delaying the reference signals, the delaying circuit should be capable of providing extremely long delay times. The arrangement described with respect to FIG. 10 is advantageous because only an $n-1$ number of flip-flop circuits are used in order to have available a $2^n - 1$ number of signals which are non-correlated with each other.

FIG. 11 illustrates an example of construction of the generator which utilizes a noise generator 126 using a discharge tube or any other physically noise generating means. The generator comprises a noise generator 126, a shaper 128 for pulse-shaping, a sample-holder 130, clock pulse generator 132 and a multiplier 134. A noise signal $n(t)$ delivered from the noise generator 126 is applied through a line 136 to one input of the shaper 128, which then produces a rectangular pulse wave $b(t)$ shown in FIG. 12*b* the value of which is +1 or −1 in accordance with the positive or negative input noise signal, respectively. The rectangular pulse wave is applied through a line 138 to the sample-holder 130. The clock pulse $p(t)$ from the clock pulse generator 132 is applied through a line 140 to the other input of the sample-holder 130 to one input of the multiplier 134 through a line 142. The sample-holder 130 samples its input signal at the trailing edge of the clock pulse and holds the sampled value pending the next clock pulse. The output signal of the sample-holder 130 shown in FIG. 12*d* is applied to the other input of the multiplier 134 through a line 144 and multiplied by the clock pulse. The output signal of the multiplier is shown in FIG. 12*e*. In this instance, the repetition period $T$ of the clock pulse is sufficiently greater than the reciprocal of the frequency band width of the signal $n(t)$, so that the signal $u(t + T)$ becomes +1 or −1 at the moment of sampling with a one-half probability irrespectively of the condition prior or posterior to the sampling. In this manner, signal $u(t + T)$ has an autocorrelation function $\phi_{uu}(\tau)$ shown in FIG. 13.

It should be noted that as the noise generator 126 may be used a mathematical means such as the random number generator using a computer.

It should also be noted here that the multipliers used in the arrangement according to this invention may be constituted by a suitable gate circuit. For example, an Exclusive OR gate is equivalent to a multiplier of +1 and −1 if logical "0" corresponds to +1 and logical "1" corresponds to −1, or vice versa.

The reference bus line may be made up of a plurality of lines thereby to send a number of reference signals and increase the number of channels of the system.

What is claimed is:

1. A multiplex transmission method comprising generating at least one reference signal, supplying said reference signal to at least one reference signal bus line, picking up said reference signal from said reference signal bus line, converting said reference signal into a plurality of carrier signals which are non-correlated with one another, producing a first set of product signals each from one of said carrier signals and a given information signal, supplying said first set of product signals to at least one carrier signal bus line, picking up said first set of product signals from said carrier signal bus line and picking up said reference signal from said reference signal bus line, converting said reference signal into said one of the carrier signals, correlating the sum of the picked up first set of product signals and said one of the carrier signals to thereby reproduce said information signal.

2. A method according to claim 1, wherein the step of converting said reference signal into said plurality of carrier signals comprises producing from said reference signal a plurality of carrier signals non-correlated with each other, and multiplying at least two of said carrier signals by each other for producing a plurality of carrier signals different from the first-named carrier signals.

3. A method according to claim 1, wherein said reference signal comprises a random signal.

4. A method according to claim 3, wherein said irregular signal comprises a pseudo-random signal.

5. A method according to claim 3, wherein said step of converting said random signal into a plurality of carrier signals comprises delaying said reference signal by a plurality of time periods different from each other, said time periods greater than the width of the autocorrelation function of said reference signal.

6. A method according to claim 4, wherein said reference signal comprises a product signal of said pseudo-random signal and a clock pulse train from which said pseudo-irregular signal is derived.

7. A multiplex transmission system comprising first means for generating at least one reference signal and applying same to at least one reference signal bus line second means receptive of said reference signal for converting said reference signal into carrier signals which are non-correlated with one another and for developing a first set of product signals comprising the product of one of said carrier signals and a given information signal, third means receptive of said first set of product signals for converting said reference signal into one of the said carrier signals and for developing a second set of product signals comprising the product of said first set of product signals and said one of the carrier signal for developing said second set of product thereby reproducing said information signal.

8. A multiplex transmission system according to claim 7, wherein said first means comprises a noise generator, a shaper connected to said noise generator, a sample-holder connected to said shaper, a clock pulse generator connected to said sample-holder circuit and a first multiplier connected to said sample-holder and said clock pulse generator.

9. A multiplex transmission system according to claim 7, wherein said first means comprises a clock pulse generator, an M-sequence generator connected to said clock pulse generator a second multiplier connected to said clock pulse generator and said M-sequence generator.

10. A multiplex transmission system according to claim 7, wherein said second means comprises a delaying circuit, a third multiplier connected to said delaying circuit for multiplying an output signal of said delaying circuit by said information signal and an amplifier connected to said third multiplier.

11. A multiplex transmission system according to claim 7, wherein said third means comprises a delaying circuit having the same delay time as that of said second means, a fourth multiplier connected to said delaying circuit and a smoothing filter connected to said fourth multiplier.

12. A multiplex transmission system according to claim 10, wherein said delaying circuit comprises a full-wave rectifier, a flip-flop circuit connected to said full-wave rectifier, a shift-register connected to said flip-flop circuit and said full-wave rectifier, a fifth multiplier connected to said shift-register and a biasing circuit connected to said fifth multiplier.

13. A method for multiplexing data transmission comprising: generating a reference signal having an autocorrelation function characteristic such that the maximum value results when the delay time between said reference signal and its delayed replica equals zero and the minimum value results when the delay time is not less than a predetermined value; transmitting said reference signals to a first plurality of transmitters and a second plurality of receivers; delaying said reference signal in each of said transmitters wherein each delay time differs from the other delay times by at least said predetermined value thereby developing a plurality of carrier signals equal in number to said first plurality of transmitters; multiplying each carrier signal with an information signal associated with the corresponding transmitter thereby generating product signals; summing the first plurality of product signals; transmitting the sum of said first plurality of product signals to each of said receivers; delaying said reference signal in each of said receivers for a delay time corresponding to the delay time of the corresponding transmitter; correlating said sum of said first plurality of product signals and said delayed reference signal thereby reproducing the corresponding information signal in each of said receivers, the correlation representing the autocorrelation of one pair of equally delayed reference signals and the autocorrelation of unequally delayed reference signals thereby obtaining both the product of the corresponding information signal and said maximum value of said autocorrelation function and the product of the other information signals and said minimum value of said autocorrelation function.

14. A data transmission multiplexon comprising: means for generating a reference signal having an autocorrelation function characteristic such that the maximum value results when the delay time between said reference signal and its delayed replica equals zero and the minimum value results when the delay time is not less than a predetermined value; a first plurality of transmitter means for developing a first plurality of carrier signals and each receptive of said reference signal and each having means for delaying said reference signal for a predetermined delay time, each delay time differing from another by at least said predetermined value, and means for multiplying said delayed reference signal by an information signal associated with the transmitter means to thereby develop a product signal; means for summing the first plurality of product signals; a second plurality of receiving means each receptive of both the sum of said first plurality of product signals and said reference signal for reproducing one information signal, each receiver means having means for delaying said reference signal for a predetermined time corresponding to the delay time of the associated transmitter means, and means for correlating the delayed reference signal and said sum of said product signals which represents the autocorrelation of equally delayed reference signals and the autocorrelation of unequally delayed reference signals thereby obtaining both the product of said one information signal and said maximum value of said autocorrelation function and the product of the other information signals and said minimum value of said autocorrelation function.

* * * * *